(12) United States Patent
Eguchi

(10) Patent No.: US 9,297,990 B2
(45) Date of Patent: Mar. 29, 2016

(54) CONFOCAL MICROSCOPE

(71) Applicant: CANON KABUSHIKI KAISHA, Tokyo (JP)

(72) Inventor: Akira Eguchi, Tucson, AZ (US)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/490,127

(22) Filed: Sep. 18, 2014

(65) Prior Publication Data

US 2015/0085360 A1    Mar. 26, 2015

(30) Foreign Application Priority Data

Sep. 25, 2013   (JP) .................................. 2013-197784

(51) Int. Cl.
*G02B 21/06*    (2006.01)
*G02B 21/00*    (2006.01)

(52) U.S. Cl.
CPC ........ *G02B 21/0032* (2013.01); *G02B 21/0076* (2013.01)

(58) Field of Classification Search
CPC .................... G02B 21/0032; G02B 21/0076
USPC .......................................... 359/385, 387, 389
See application file for complete search history.

(56) References Cited

U.S. PATENT DOCUMENTS

| 5,717,519 | A | * | 2/1998 | Sugiyama et al. ............. 359/368 |
| 5,939,709 | A | * | 8/1999 | Ghislain et al. ................ 250/216 |
| 2004/0149883 | A1 | | 8/2004 | Eda |
| 2010/0134867 | A1 | * | 6/2010 | Gugel et al. ................... 359/287 |

FOREIGN PATENT DOCUMENTS

| JP | 2247605 A | 10/1990 |
| JP | 10213751 A | 8/1998 |
| JP | 2001091847 A | 4/2001 |
| JP | 2010014839 A | 1/2010 |
| JP | 2013167654 A | 8/2013 |
| WO | 02068903 A1 | 9/2002 |

OTHER PUBLICATIONS

M. Gu, "Principles of Three-Dimensional Imaging in Confocal Microscopes", World Scientific, 1996, pp. 47-149. Cited in Specification.

\* cited by examiner

*Primary Examiner* — Frank Font
(74) *Attorney, Agent, or Firm* — Rossi, Kimms & McDowell LLP

(57) ABSTRACT

A confocal microscope includes an illumination optical system configured to uniformly illuminate at least part of a first confocal stop with a light beam from a light source, a first collection optical system configured to collect a light beam passing through the first confocal stop onto a specimen, a second collection optical system configured to collect a light beam from the specimen onto a second confocal stop, a detection unit configured to detect a light beam passing through the second confocal stop, and a light intensity control member provided to at least one of the first collection optical system and the second collection optical system and having a transmittance of a first region including an optical axis that is lower than a transmittance of a second region around the first region.

15 Claims, 6 Drawing Sheets

CONFOCAL MICROSCOPE

BACKGROUND OF THE INVENTION

1. Field of the Invention

The present invention relates to a confocal microscope.

2. Description of the Related Art

Diagnosis and research of diseases require observation of a thick specimen such as a biological sample for a structure in a thickness direction (depth direction). In observation of such a thick object through a normal microscope, light from planes other than a focal plane is adversely superimposed as blur on the focal plane. This makes it difficult to accurately observe the structure in the thickness direction.

For this reason, a confocal microscope has been conventionally used. The confocal microscope includes a pinhole and detects only light passing through the pinhole. Thus, the pinhole needs to have an appropriate size to obtain a sufficient light quantity for observation. However, a larger pinhole degrades resolution. M. Gu, "Principles of Three-Dimensional Imaging in Confocal Microscopes", World Scientific, 1996, pp. 47-149 discloses a configuration for improving the depth-directional resolution by introducing a ring zonal (an annular) shaped pupil of a collection optical system of a confocal microscope. Japanese Patent Laid-open No. H2-247605 discloses a method using an annular mask disposed at the pupil position of a collection optical system to allow a depth of focus to be varied.

In addition, a confocal microscope that varies the depth-directional resolution by using a multi-pinhole array is known. International Publication No. WO 2002/068903 discloses a configuration in which the depth-directional resolution is variable by varying the numerical aperture of a collimating lens.

However, the use of a larger pinhole to obtain a sufficient light quantity degrades the depth-directional resolution. On the other hand, the use of the multi-pinhole array requires Koehler illumination to keep an illumination light intensity uniform. In this case, a pinhole having a finite size is illuminated with a partially coherent light, which results in considerable influence on the resolution by spatial coherence of the illumination light on a surface of the pinhole. Thus, the resolution needs to be improved based on quantitative understanding of the spatial coherence on the surface of the pinhole.

SUMMARY OF THE INVENTION

The present invention provides a confocal microscope having an improved resolution in a depth direction for a specimen.

A confocal microscope as one aspect of the present invention includes an illumination optical system configured to uniformly illuminate at least part of a first confocal stop, a first collection optical system configured to collect a light beam passing through the first confocal stop onto a specimen, a second collection optical system configured to collect a light beam from the specimen onto a second confocal stop, a detection unit configured to detect a light beam passing through the second confocal stop, and a light intensity control member provided to at least one of the first collection optical system and the second collection optical system and having a transmittance of a first region including an optical axis that is lower than a transmittance of a second region around the first region.

Further features and aspects of the present invention will become apparent from the following description of exemplary embodiments with reference to the attached drawings.

DESCRIPTION OF THE EMBODIMENTS

Figure 1:
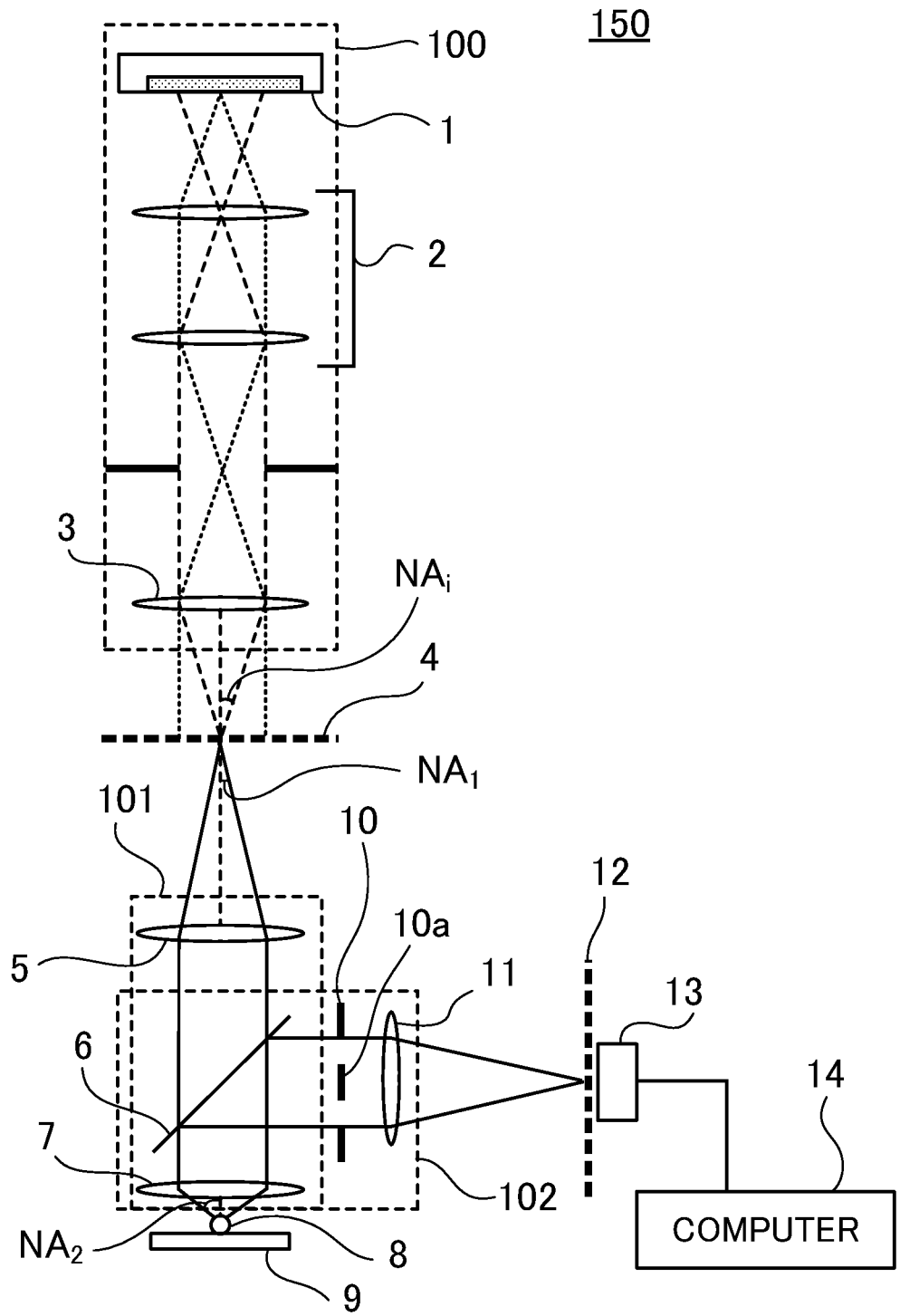
FIG. 1 is a schematic configuration diagram of a confocal microscope in a first embodiment.

Exemplary embodiments of the present invention will be described below with reference to the accompanied drawings. In each of the drawings, the same elements will be denoted by the same reference numerals and the duplicate descriptions thereof will be omitted.

First Embodiment

First, a confocal microscope in a first embodiment of the present invention will be described. FIG. 1 is a schematic configuration diagram of a confocal microscope 150 (confocal optical microscope) in the present embodiment. In FIG. 1, reference numeral 100 denotes an illumination optical system. The illumination optical system 100 includes a light source 1 including an LED light source or a halogen light source, a relay lens 2, and a collimating lens 3. The illumination optical system 100 uniformly illuminates at least part of a confocal stop 4 (first confocal stop) described later with a light beam from the light source 1.

The confocal stop 4 is disposed behind the illumination optical system 100 (between the illumination optical system 100 and a collection optical system 101 described later). The confocal stop 4 includes a multi-pinhole array such as a Nipkow disk, for example, including a plurality of pinholes. Since the plurality of pinholes are disposed, a single image capturing obtains information of a plurality of places, which enables a fast image acquisition.

The collection optical system 101 (first collection optical system) is disposed behind the confocal stop 4 (at a lower part of FIG. 1). The collection optical system 101 includes a collimating lens 5, a dichroic mirror 6, and an objective lens 7. The collection optical system 101 collects a light beam passing through the confocal stop 4 onto a specimen 8 (object). In FIG. 1, of the light beam passing through the confocal stop 4, a light beam passing through one pinhole is illustrated by a solid line. The specimen 8 is, for example, a biological sample dyed with a fluorescent material. In FIG. 1, the specimen 8 is illustrated as a point-like object for simplification, but is in reality a specimen such the biological sample having a certain size. The specimen 8 is excited by the light beam collected by the collection optical system 101 and emits fluorescent light. The specimen 8 is placed on a stage 9 finely movable in a three-dimensional direction. In this manner, the confocal microscope 150 of the present embodiment is configured to be capable of acquiring information of the specimen 8.

An imaging lens 11 is disposed lateral to the dichroic mirror 6 (at a right part of FIG. 1). The objective lens 7, the dichroic mirror 6, a filter 10, and the imaging lens constitute a collection optical system 102 (second collection optical system). The dichroic mirror 6 only reflects the fluorescent light emitted from the specimen 8. This removes excitation light which is utilized to excite a fluorescent material in the specimen 8 and makes it possible to detect only the fluorescent light from the specimen 8. The collection optical system 102 collects the light beam from the specimen 8 onto a confocal stop 12 (second confocal stop) described later.

Figures 4A, 4B, 4C:
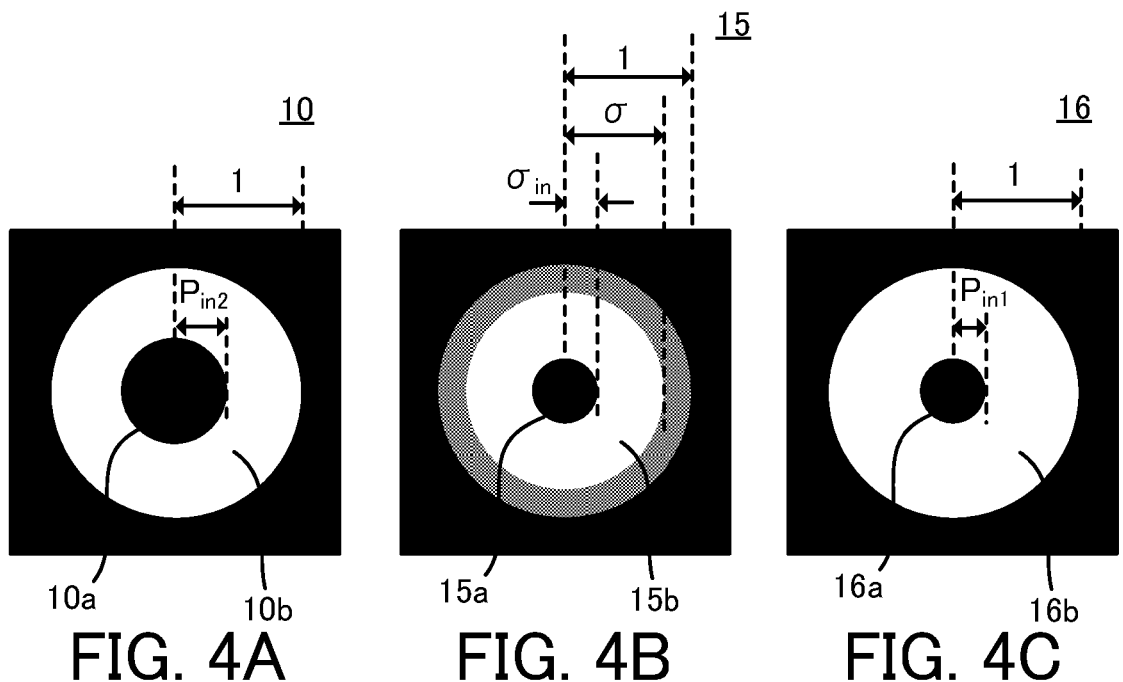
FIGS. 4A to 4C are configuration diagrams of filters in the respective embodiments.

The filter 10 (light intensity control member) is disposed in the collection optical system 102. The filter 10 is preferably disposed at the pupil position of the collection optical system 102 or the vicinity thereof. The filter 10 is also preferably disposed between the dichroic mirror 6 and the imaging lens 11. FIG. 4A is a configuration diagram of the filter 10 in the present embodiment. The filter 10 includes a circular-shaped light-shielding portion 10a (first region) disposed centering an optical axis. With the radius of the pupil of the collection optical system 102 taken to be unity, the radius (size) of the light-shielding portion 10a is represented by $P_{in2}$. In the present embodiment, the radius $P_{in2}$ is preferably set to be 0.6 or less.

A transmissive portion 10b is provided around the light-shielding portion 10a. The transmissive portion 10b preferably has an annular shape centering around the optical axis. Such a configuration allows the filter 10 to convert fluorescent light collimated by the objective lens 7 into a ring zonal light beam (annular light beam). In this manner, in the present embodiment, the filter 10 provided to the collection optical system 102 has the transmittance of the first region (light-shielding portion 10a) including the optical axis that is lower than the transmittance of a second region (the transmissive portion 10b) around the first region.

As described above, the light-shielding portion 10a of the filter 10 has a circular shape centering around the optical axis with a predetermined radius (radius $P_{in2}$). The transmissive portion 10b of the filter 10 has an annular shape centering around the optical axis and around the light-shielding portion 10a. The radius $P_{in2}$ of the light-shielding portion 10a is preferably not larger than three-fifths (0.6) of the numerical aperture of the collection optical system 102. In other words, the radius $P_{in2}$ of the light-shielding portion 10a is preferably not larger than three-fifths (0.6) of the radius of the circumference of the transmissive portion 10b centering around the optical axis. These preferences similarly apply to a filter 16 described later.

The confocal stop 12 and a light detector 13 (detection unit) are disposed behind the imaging lens 11 (at the right part of FIG. 1). The confocal stop 12 is shaped the same as the confocal stop 4 and is disposed at a position conjugate to that of the confocal stop 4. The light detector 13 includes a photoelectric conversion element such as a CCD and a CMOS and detects a light beam passing through the confocal stop 12. The light detector 13 is connected to a computer 14. A light signal detected by the light detector 13 is input to the computer 14 and is stored in a storage unit such as an internal memory of the computer 14.

Subsequently, an operation of the confocal microscope 150 in the present embodiment will be described. Light emitted from the light source 1 becomes a parallel light beam through the illumination optical system 100 and illuminates the confocal stop 4 by Koehler illumination. The Koehler illumination allows each pinhole of the confocal stop 4 to be illuminated at uniform intensity (light intensity). This can reduce illumination intensity unevenness in an obtained image.

The light beam passing through the confocal stop 4 is collected onto the specimen 8 through the collection optical system 101. This light excites the fluorescent material provided to the specimen 8 (inside thereof), whereby fluorescent light is emitted. The fluorescent light emitted from the specimen 8 is collected onto the confocal stop 12 through the collection optical system 102. In this process, the light beam is converted into a ring zonal shape (annular shape) by the filter 10. A pinhole on the confocal stop 12 allows only fluorescent light emitted from a position conjugate to the pinhole on the specimen 8 to reach the light detector 13, whereas light emitted not from the conjugate position is removed. This configuration allows acquisition of an image of a point on the specimen 8.

The light beam passing through the confocal stop 12 is converted into an electrical signal by the light detector 13. This electrical signal is transmitted to the computer 14 and stored therein. The specimen 8 is three-dimensionally scanned with the finely movable stage 9. The computer 14 can obtain a three-dimensional image of the specimen 8 by performing the detection described above at each scanning position. The three-dimensional image thus obtained is displayed on a monitor (display unit) (not illustrated).

The confocal microscope 150 of the present embodiment allows three-dimensional observation of a fluorescent material distribution of the specimen 8. In addition, in the present embodiment, a fluorescent light from the specimen 8 excited by a light beam passing through the confocal stop 4 illuminated by the Koehler illumination is converted into ring zonal light, thereby allowing resolution in a depth direction to be enhanced.

Subsequently, expressions for calculating the effect of the present embodiment will be derived. First, assuming that the sizes of the pinholes of the confocal stop and the confocal stop 12 are infinitely small, a three-dimensional imaging expression is considered for the confocal microscope 150. According to M. Gu, "Principles of Three-Dimensional Imaging in Confocal Microscopes", World Scientific, 1996, pp. 47-149, the three-dimensional imaging expression for the confocal microscope 150 is represented by Expression (1) below.

$$I(x_s,y_s,z_s)=I_{col1}(x_s,y_s,z_s)I_{col2}(x_s,y_s,z_s) \otimes_3 o(x_s,y_s,z_s) \quad (1)$$

In Expression (1), symbol $I_{col1}(x, y, z)$ represents an intensity point spread function (IPSF) of the collection optical system 101. Symbol $I_{col2}(x, y, z)$ represents the IPSF of the collection optical system 102. Symbol $o(x, y, z)$ is a spatial distribution of luminance efficiency of the specimen 8. Symbols $x_s$, $y_s$, and $z_s$ represent a scanning position of the specimen 8. Symbol $\otimes_3$ represents a convolution with respect to all the variables x, y, and z.

In reality, since the pinholes of the confocal stop 4 and the confocal stop 12 have finite sizes, they exert influence on the illumination optical system 100. To take the influence of the illumination optical system 100 into account, an effective light source $s_0$ ($\xi$, $\eta$) of the illumination optical system 100 is defined as represented by Expression (2) below.

$$s_0(\xi_0, \eta_0) = \begin{cases} 1 & \rho_0 \leq \sigma \\ 0 & \rho_0 > \sigma \end{cases} \quad \rho_0 = \sqrt{\xi_0^2 + \eta_0^2} \quad (2)$$

In Expression (2), symbol σ represents the ratio of the numerical aperture $NA_i$ of the collimating lens 3 to the numerical aperture $NA_1$ of the collimating lens 5. In other words, σ represents the ratio of the numerical aperture $NA_i$ of the illumination optical system 100 on the confocal stop 4 side to the numerical aperture $NA_1$ of the collection optical system 101 on the confocal stop 4 side. Symbols $\xi_0$ and $\eta_0$ are xy coordinates on an effective light source plane. As illustrated in FIG. 1, the confocal stop 4 is illuminated with the effective light source $s_0(\xi, \eta)$ by the Koehler illumination. Consequently, the intensity point spread function IPSF of the collection optical system 101 changes. When an amplitude point spread function (APSF) of the collection optical system 101 is represented by $h_{col1}(x, y, z)$ and a transmittance distribution of the confocal stop 4 is represented by S(x, y), the IPSF ($I'_{col1}$ (x, y, z)) of the collection optical system 101 is represented by Expression (3) below.

$$I'_{col1}(x,y,z) = \int_{-\infty}^{\infty}\int_{-\infty}^{\infty} s_0(\xi_0, \eta_0) |h_{col1}(x,y,z) \otimes_3 S(x,y)\delta(z) \exp[2\pi i(\xi_0 x + \eta_0 y)]|^2 d\xi_0 d\eta_0 \quad (3)$$

In addition, the pinhole of the confocal stop 12 has a finite size. Thus, the transmittance distribution of the confocal stop 12 is represented by D(x, y), and according to M. Gu, "Principles of Three-Dimensional Imaging in Confocal Microscopes", World Scientific, 1996, pp. 47-149, the IPSF ($I'_{col2}$ (x, y, z)) of the collection optical system 102 is represented by Expression (4) below.

$$I'_{col2}(x,y,z) = I_{col2}(x,y,z) \otimes_3 D(x,y)\delta(z) \quad (4)$$

From the IPSF corrected by using Expression (3) and Expression (4), the three-dimensional imaging expression of the confocal microscope 150 is defined as Expression (5) below.

$$I'(x_s, y_s, z_s) = I'_{col1}(x_s, y_s, z_s) I'_{col2}(x_s, y_s, z_s) \otimes_3 o(x_s, y_s, z_s) \quad (5)$$

Expression (5) calculates the three-dimensional image of the confocal microscope 150 in the present embodiment.

In the present embodiment, the filter 10 is disposed on the pupil plane of the collection optical system 102. Thus, a pupil function $P_{col2}(\xi, \eta)$ of the collection optical system 102 is defined by Expression (6) below.

$$P_{col2}(\xi, \eta) = \begin{cases} 1 & \rho \leq 1 \text{ and } \rho \geq P_{in2} \\ 0 & \text{otherwise} \end{cases} \quad \rho = \sqrt{\xi^2 + \eta^2} \quad (6)$$

In Expression (6), symbols ξ and η are xy coordinates on the pupil surface.

Figure 5:
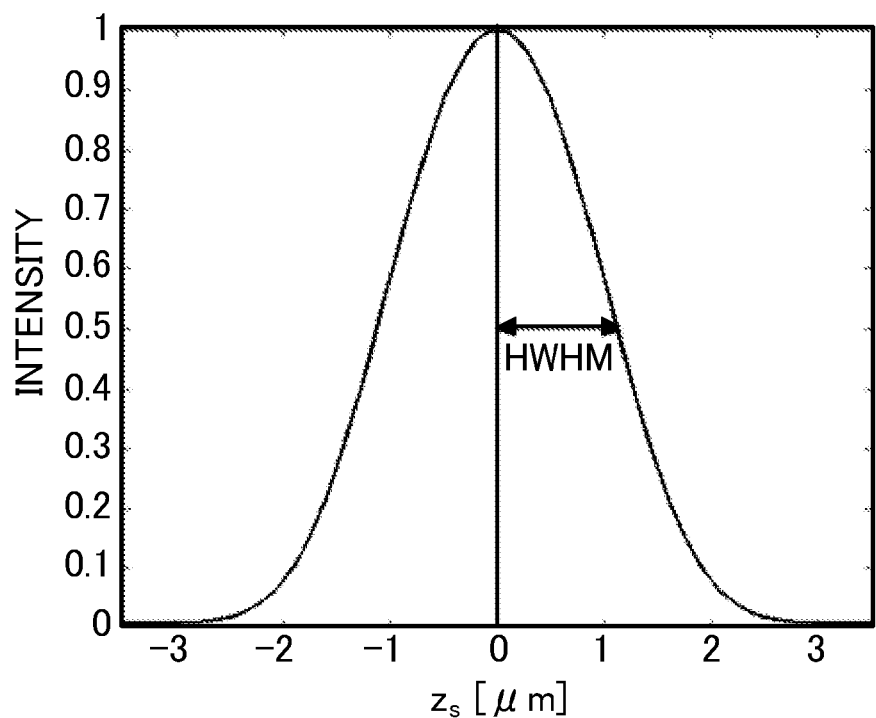
FIG. 5 is a graph of an image intensity distribution (light intensity distribution) at a scanning position in a depth direction in the first embodiment.

Subsequently, referring to FIG. 5, an image intensity distribution obtained by the confocal microscope 150 in the present embodiment will be described. FIG. 5 illustrates the image intensity distribution (light intensity distribution) at the scanning position $z_s$ in the depth direction in observation of a fluorescent body (the specimen 8) having an infinitely small size. In FIG. 5, a horizontal axis represents the scanning position $z_s$, and a vertical axis represents the intensity. The body (specimen 8) exists at $z_s=0$. In the present embodiment, the wavelength is 574 nm, the numerical aperture $NA_2$ of the objective lens 7 is 0.7, and the diameter of each of the pinholes of the confocal stop 4 and the confocal stop 12 is 1.4 μm. For simplification, the magnification is 1, which means that $NA_1=NA_2$. The ratio σ is 1.

In the present embodiment, to quantitatively evaluate the depth-directional resolution, the half width at half minimum (HWHM) is defined. The HWHM is an amount related to a position at which a detected intensity decreases by half of its value at $z_s=0$ (distance between a position at $z_s=0$ and the position at which the detected intensity decreases by half), and corresponds to a distance illustrated by an arrow in FIG. 5. A smaller HWHM means the distinguishability of a smaller object, that is, a higher resolution.

Figure 6:
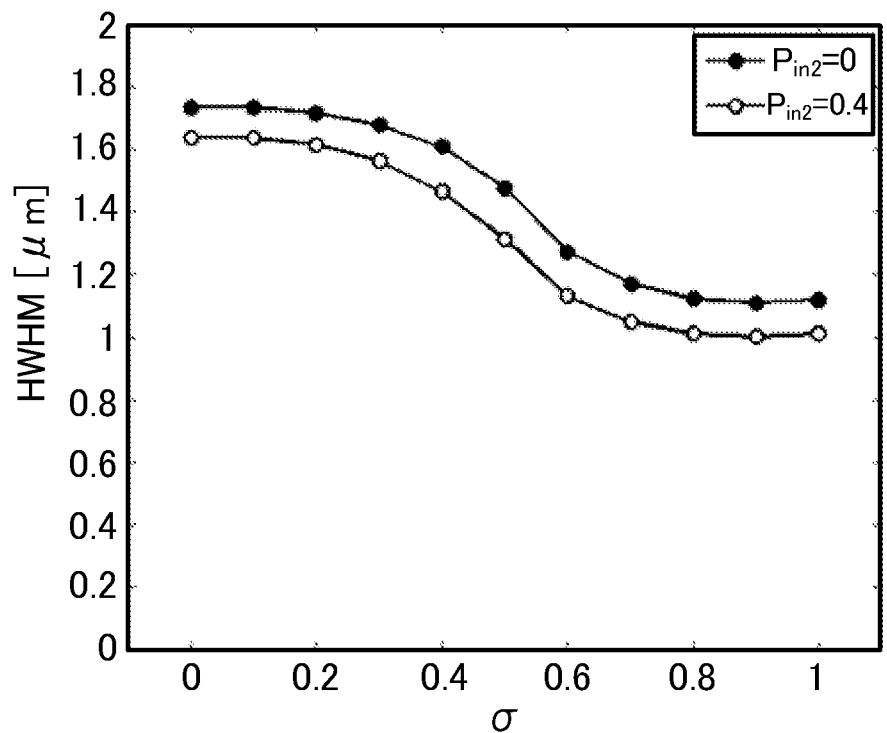
FIG. 6 is a graph illustrating σ dependency of HWHM in the first embodiment.

FIG. 6 is a graph illustrating a dependency of the HWHM. In FIG. 6, a horizontal axis represents a, and a vertical axis represents the HWHM. As illustrated in FIG. 6, independently of the radius $P_{in2}$ of the light-shielding portion 10a (in both cases of $P_{in2}=0$ and 0.4), a larger σ than 0.3 leads to a smaller HWHM than that when σ is 0. This effect (reduction) is significant when σ is larger than 0.3. In addition, along with change from 0 to 0.4 of the radius $P_{in2}$ of the light-shielding portion 10a, the HWHM decreases for all values of σ. In this manner, the depth-directional resolution can be improved by partially coherent illumination. In the present embodiment, σ is preferably set within a range of 0.3≤σ≤1.

Figure 7:
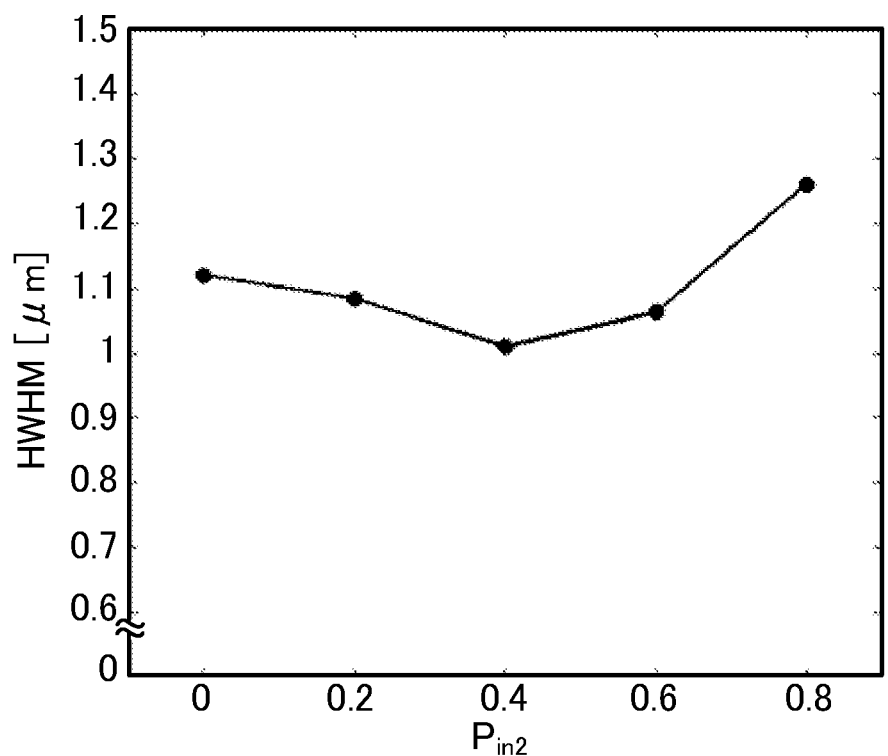
FIG. 7 is a graph illustrating $P_{in2}$ dependency of HWHM in the first embodiment.

Subsequently, to evaluate this effect, the change of the HWHM along with the radius $P_{in2}$ of the light-shielding portion 10a will be described. FIG. 7 is a graph illustrating $P_{in2}$ dependency of the HWHM. In FIG. 7, a horizontal axis represents the radius $P_{in2}$ of the light-shielding portion 10a, and a vertical axis represents the HWHM [μm]. The ratio σ is 1. As illustrated in FIG. 7, in a case where the radius $P_{in2}$ of the light-shielding portion 10a is within a range of 0 to 0.6 (0<$P_{in2}$≤0.6), the HWHM is smaller than when $P_{in2}$ is 0. In this manner, the depth-directional resolution can be improved by performing center shielding for the collection optical system 102.

In the present embodiment, the filter 10 is disposed at the pupil position of the collection optical system 102, but is not limited thereto. For example, the filter 10 may be disposed in the collection optical system 101. In other words, in the present embodiment, the filter 10 is provided to at least one of the collection optical system 101 and the collection optical system 102. The filter 10 is preferably disposed at the pupil position of at least one of the collection optical system 101 and the collection optical system 102 or at a position conjugate to the pupil position (or the vicinity thereof). When the filter 10 is provided to the collection optical system 101, the filter 10 is preferably disposed between the collimating lens 5 and the dichroic mirror 6.

Second Embodiment

Figure 2:
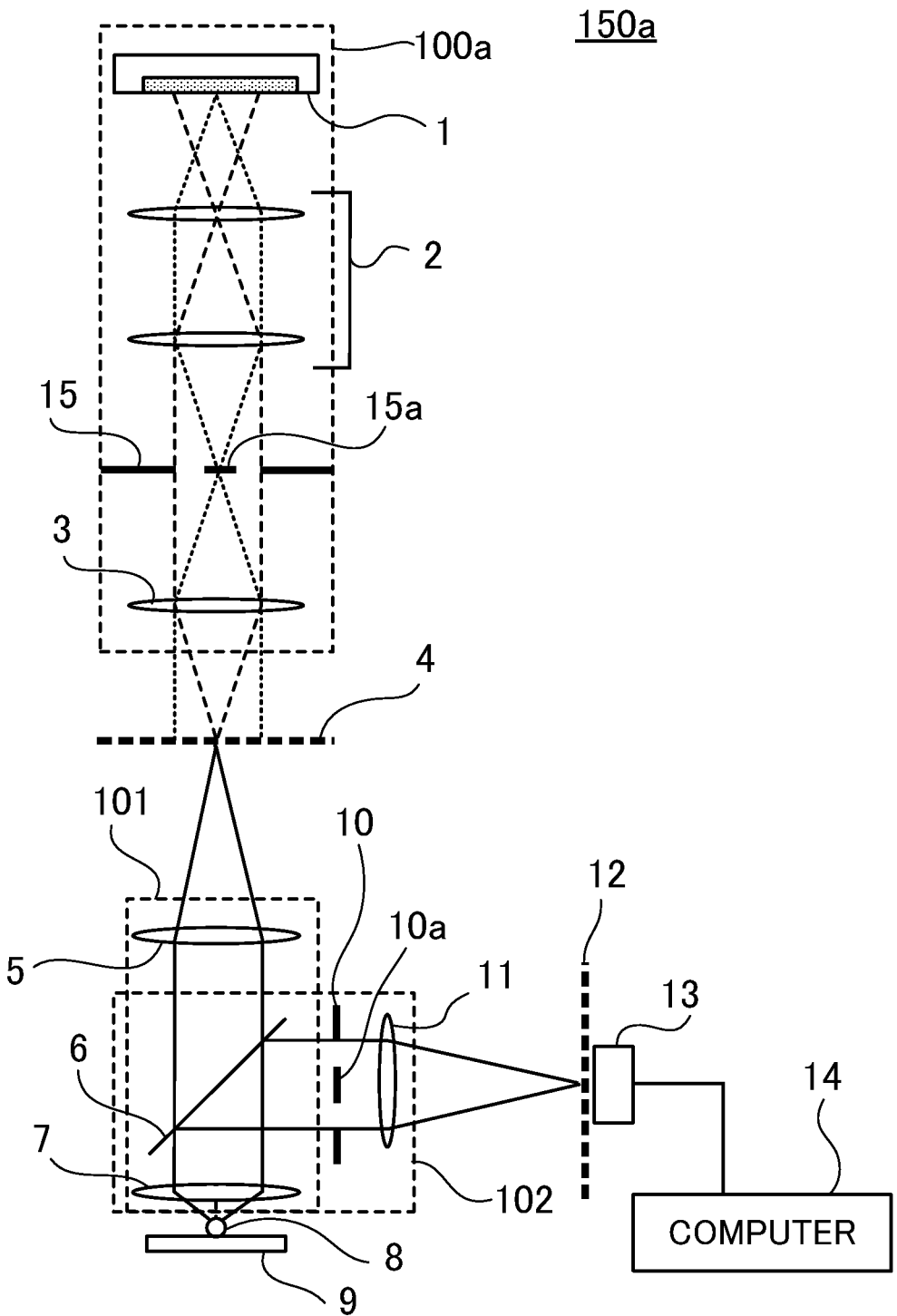
FIG. 2 is a schematic configuration diagram of a confocal microscope in a second embodiment.

Next, a confocal microscope in a second embodiment of the present invention will be described. FIG. 2 is a schematic configuration diagram of a confocal microscope 150a (confocal optical microscope) in the present embodiment. In FIG. 2, the same elements as those in FIG. 1 will be denoted by the same reference numerals and the detailed descriptions thereof will be omitted.

The confocal microscope 150a of the present embodiment differs from the confocal microscope 150 in that the illumination optical system 100 of the confocal microscope 150 of the first embodiment is replaced with an illumination optical system 100a including a filter 15 (second light intensity control member). The filter 15 is preferably disposed at a position conjugate to the pupil positions of the collection optical system 101 and the collection optical system 102. The filter 15 is also preferably disposed between the relay lens 2 and the collimating lens 3. The rest of the configuration of the confocal microscope 150a is the same as that of the confocal microscope 150.

FIG. 4B is a configuration diagram of the filter 15. The filter 15 includes a circular-shaped light-shielding portion 15a (third region) disposed centering around the optical axis. The ratio of a numerical aperture NA of the collimating lens 3 to a numerical aperture $NA_1$ of the collimating lens 5 is represented by σ, and the radius (size) of the light-shielding portion 15a is represented by $\sigma_{in}$ (second radius). In FIG. 4B, a white region (fourth region) is a region (transmissive portion 15b) through which light (light beam) passes, a central black region is a light-shielding element (the light-shielding portion 15a), and a gray region represents a difference between the sizes of the numerical apertures of the collimating lens 3 and the collimating lens 5.

In the present embodiment, the radius $\sigma_{in}$ of the light-shielding portion 15a is preferably set to be 0.8 or less ($0<\sigma_{in}\leq 0.8$). In other words, the radius $\sigma_{in}$ of the light-shielding portion 15a is preferably not larger than four-fifths (0.8) of the numerical aperture of the collection optical system 101. The disposition of the filter 15 having such a configuration allows a light beam from the light source 1 to be shaped into a ring zonal shape (annular shape). In this manner, in the present embodiment, the filter 15 provided to the illumination optical system 100 has the transmittance of the third region (light-shielding portion 15a) including the optical axis that is lower than the transmittance of the fourth region (transmissive portion 15b) around the third region. The filter 15 is preferably disposed at the pupil position of the illumination optical system 100 or a position conjugate to the pupil position (or the vicinity thereof).

The use of the filter 15 defines (changes) the shape of an effective light source of the illumination optical system 100a as expressed by Expression (7) below.

$$s_0(\xi_0, \eta_0) = \begin{cases} 1 & \rho_0 \leq \sigma \text{ and } \rho_0 \geq \sigma_{in} \\ 0 & \text{otherwise} \end{cases} \quad (7)$$

Subsequently, an operation of the confocal microscope 150a in the present embodiment will be described. The shape of a light beam emitted from the light source 1 is converted into a ring zonal shape (annular shape) through the relay lens 2 and the filter 15. The ring zonal light beam thus converted is made incident on the confocal stop 4 through the collimating lens 3 to perform the Koehler illumination. Change in the shape of an illumination light beam leads to change in the spatial coherence of illumination light on the confocal stop 4. As a result, the resolution of the confocal microscope 150a changes accordingly. In this case, in the present embodiment, the depth-directional resolution can be improved by converting the illumination light beam into the ring zonal light beam.

Figure 8:
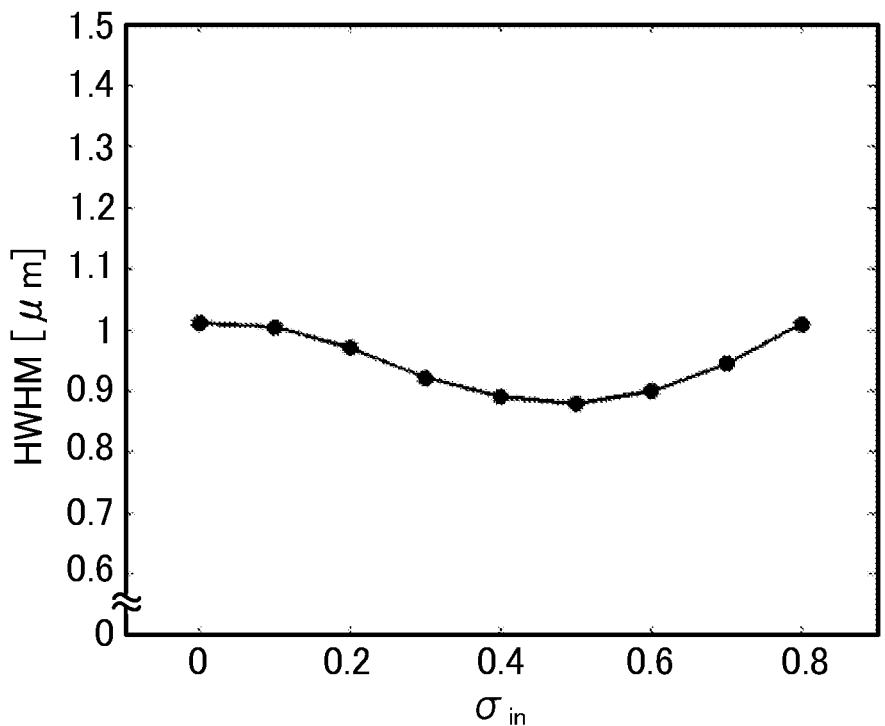
FIG. 8 is a graph illustrating $\sigma_{in}$ dependency of HWHM in the second embodiment.

FIG. 8 is a graph illustrating $\sigma_{in}$ dependency of the HWHM. In FIG. 8, a horizontal axis represents $\sigma_{in}$, and a vertical axis represents the HWHM. Symbol $\sigma_{in}$ is a value obtained by dividing a numerical aperture of a region shielded by the filter 15 by the numerical aperture $NA_1$ of the collimating lens. The calculation condition is the same as that in the first embodiment: $P_{in2}$ is 0.4 and σ is 1. As illustrated in FIG. 8, in a case where $\sigma_{in}$ is within a range of 0 to 0.8 ($0<\sigma_{in}\leq 0.8$), the HWHM is smaller than when $\sigma_{in}$ is 0. In other words, the HWHM can be reduced by setting $\sigma_{in}$ to be within the range of $0<\sigma_{in}\leq 0.8$.

Third Embodiment

Figure 3:
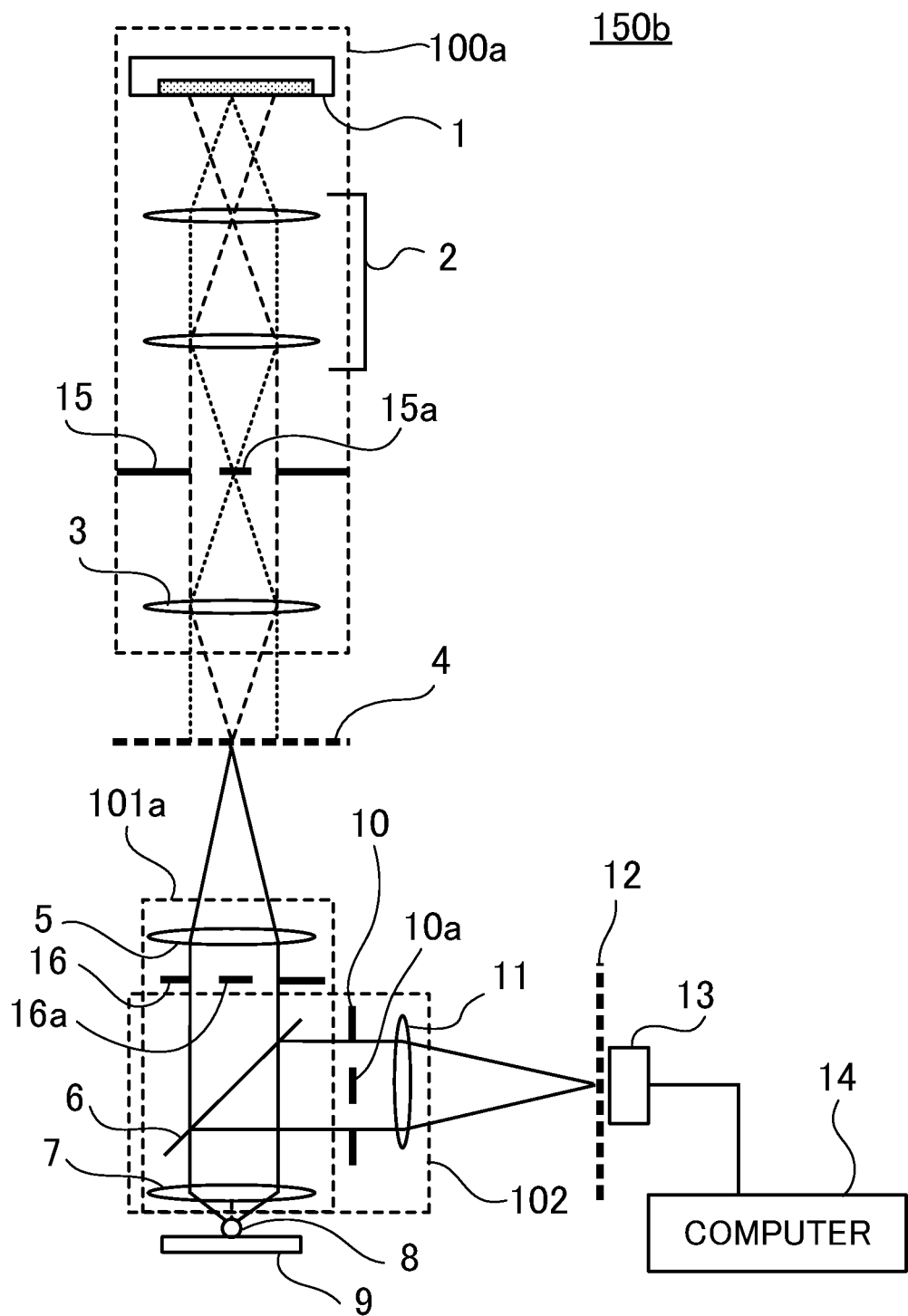
FIG. 3 is a schematic configuration diagram of a confocal microscope in a third embodiment.

Next, a confocal microscope in a third embodiment of the present invention will be described. FIG. 3 is a schematic configuration diagram of a confocal microscope 150b (confocal optical microscope) in the present embodiment. In FIG. 3, the same elements as those in FIGS. 1 and 2 will be denoted by the same reference numerals and the detailed descriptions thereof will be omitted.

The confocal microscope 150b in the present embodiment differs from the confocal microscope 150a in that the collection optical system 101 of the confocal microscope 150a of the second embodiment is replaced with a collection optical system 101a including a filter 16 (light intensity control member). The filter 16 is disposed at a position conjugate to the pupil positions of the collection optical system 101a and the collection optical system 102. The filter 16 is preferably disposed between the collimating lens 5 and the dichroic mirror 6. The rest of the configuration of the confocal microscope 150b is the same as that of the confocal microscope 150a.

FIG. 4C is a configuration diagram of the filter 16. Similarly to the filter 10, the filter 16 includes a circular-shaped light-shielding portion 16a disposed centering around the optical axis. With the radius the pupil of the collection optical system 101 taken to be unity and the radius (size) of the light-shielding portion 16a represented by $P_{in1}$, the radius $P_{in1}$ of the light-shielding portion 16a is preferably set to be equal to or smaller than 0.6 ($0<P_{in1}\leq 0.6$). A transmissive portion 16b is provided around the light-shielding portion 16a. The transmissive portion 16b preferably has an annular shape centering around the optical axis. The filter 16 thus disposed converts a light beam passing through the confocal stop 4 into the ring zonal light beam. In this manner, in the present embodiment, the filter 16 provided to the collection optical system 101 has the transmittance of the first region (the light-shielding portion 16a) including the optical axis that is lower than the transmittance of the second region (transmissive portion 16b) around the first region.

The use of the filter 16 defines (changes) a pupil function $P_{col1}(\xi, \eta)$ of the collection optical system 101 as expressed by Expression (8).

$$P_{col1}(\xi, \eta) = \begin{cases} 1 & \rho \leq 1 \text{ and } \rho \geq P_{in1} \\ 0 & \text{otherwise} \end{cases} \quad (8)$$

Subsequently, an operation of the confocal microscope 150b in the present embodiment will be described. The shape of the light beam passing through the confocal stop 4 is converted into a ring zonal shape (annular shape) through the collimating lens 5 and the filter 16. The ring zonal light beam thus converted is collected onto the specimen 8 through the objective lens 7 to excite fluorescent light dyes in the specimen 8. In this case, in the present embodiment, the depth-directional resolution can be improved by converting the illumination light beam into the ring zonal light beam.

Figure 9:
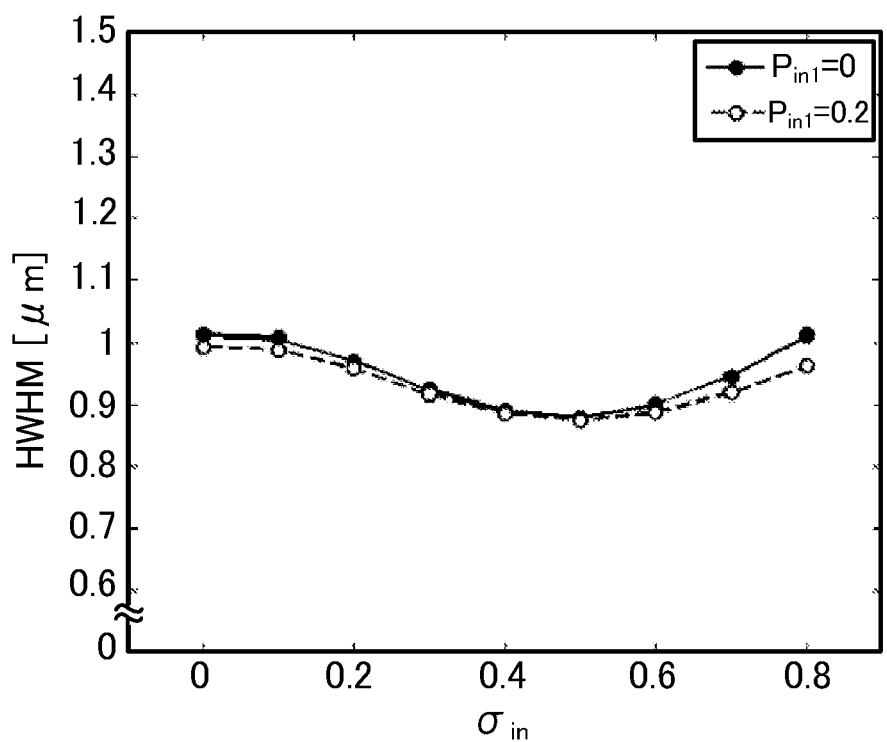
FIG. 9 is a graph illustrating $\sigma_{in}$ dependency of HWHM in the third embodiment.

FIG. 9 is a graph illustrating $\sigma_{in}$ dependency of the HWHM. In FIG. 9, white dots illustrate a case where $P_{in1}$ is 0.2, and black dots illustrate a case where $P_{in1}$ is 0, that is, the filter 16 is not disposed. In the present embodiment, $P_{in2}$ is 0.4, and σ is 1. As illustrated in FIG. 9, when $\sigma_{in}$ is within a range of 0 to 0.8 ($0<\sigma_{in}\leq 0.8$), the HWHM is smaller in the case where the filter 16 is disposed in the collection optical system 101a ($P_{in1}=0.2$) than in the case where the filter 16 is not disposed ($P_{in1}=0$).

In the embodiments, the filters 10, 15, and 16 each has a ring zonal shape (annular shape), but is not limited thereto and a filter having any shape other than the ring zonal shape may be disposed. The effects of the embodiments can be achieved with an element (member) that attenuates light in the region of the optical axis. In addition, in each of the embodiments, the dichroic mirror 6 is disposed between the collimating lens 5 and the objective lens 7, but is not limited thereto. For example, the dichroic mirror 6 may be disposed between the collimating lens 3 and the confocal stop 4. With this configuration, the confocal stop 12 can be omitted. Furthermore, the embodiments describe the case of observing the fluorescent light from the specimen 8, but are not limited thereto. The effects of the embodiments can be also achieved in a case of observing a reflected light or a transmitted light from the specimen 8.

The confocal microscope in each of the embodiments allows a highly accurate observation of the depth-directional structure of a specimen in observation of, for example, a biological sample and an LSI surface geometry. Each of the embodiments provides a confocal microscope having an improved depth-directional resolution of the specimen.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-197784, filed on Sep. 25, 2013, which is hereby incorporated by reference herein in its entirety.

What is claimed is:

1. A confocal microscope comprising:
an illumination optical system configured to uniformly illuminate at least part of a first confocal stop;
a first collection optical system configured to collect a light beam passing through the first confocal stop onto a specimen;
a second collection optical system configured to collect a light beam from the specimen onto a second confocal stop;
a detection unit configured to detect a light beam passing through the second confocal stop;
a first light intensity control member provided to at least one of the first collection optical system and the second collection optical system and having a transmittance of a first region including an optical axis that is lower than a transmittance of a second region around the first region; and
a second light intensity control member provided to the illumination optical system and having a transmittance of a third region including the optical axis that is lower than a transmittance of a fourth region around the third region.

2. The confocal microscope according to claim 1, wherein the first light intensity control member is disposed at the pupil position of at least one of the first collection optical system and the second collection optical system or a position conjugate to the pupil position.

3. The confocal microscope according to claim 1, wherein the second light intensity control member is disposed at the pupil position of the illumination optical system or a position conjugate to the pupil position.

4. The confocal microscope according to claim 1, wherein:
the third region of the second light intensity control member has a circular shape centering around the optical axis with a second radius, and
the second radius is not larger than four-fifths of the numerical aperture of the first collection optical system.

5. The confocal microscope according to claim 1, wherein:
the first confocal stop includes a multi-pinhole array including a plurality of pinholes, and
the illumination optical system is configured to perform Koehler illumination on the first confocal stop.

6. The confocal microscope according to claim 1, wherein the first collection optical system includes a collimating lens, a dichroic mirror, and an objective lens.

7. The confocal microscope according to claim 6, wherein the first light intensity control member is disposed between the collimating lens and the dichroic mirror.

8. The confocal microscope according to claim 1, wherein the second collection optical system includes an objective lens, a dichroic mirror, and an imaging lens.

9. The confocal microscope according to claim 8, wherein the first light intensity control member is disposed between the dichroic mirror and the imaging lens.

10. The confocal microscope according to claim 1, wherein:
the illumination optical system includes a relay lens and a collimating lens, and
the second light intensity control member is disposed between the relay lens and the collimating lens.

11. The confocal microscope according to claim 1, wherein the confocal microscope is configured to acquire information of the specimen that fluoresces with the light beam collected by the first collection optical system.

12. The confocal microscope according to claim 1, further comprising a third light intensity control member provided to the first collection optical system and having a transmittance of a fifth region including the optical axis that is lower than a transmittance of a sixth region around the fifth region, the first light intensity control member being provided to the second collection optical system.

13. A confocal microscope comprising:
an illumination optical system configured to uniformly illuminate at least part of a first confocal stop;
a first collection optical system configured to collect a light beam passing through the first confocal stop onto a specimen;
a second collection optical system configured to collect a light beam from the specimen onto a second confocal stop;
a detection unit configured to detect a light beam passing through the second confocal stop; and
a light intensity control member provided to at least one of the first collection optical system and the second collection optical system and having a transmittance of a first region including an optical axis that is lower than a transmittance of a second region around the first region, wherein:
the first region of the light intensity control member has a circular shape centering around the optical axis with a predetermined radius, and
the predetermined radius is not larger than three-fifths of the numerical aperture of the first collection optical system or the second collection optical system.

14. The confocal microscope according to claim 13, wherein:
the first region of the light intensity control member has a circular shape centering around the optical axis with a predetermined radius, and the second region has an annular shape around the first region centering around the optical axis, and
the predetermined radius of the first region is not larger than three-fifths of a radius of a circumference of the second region centering around the optical axis.

15. A confocal microscope comprising:
- an illumination optical system configured to uniformly illuminate at least part of a first confocal stop;
- a first collection optical system configured to collect a light beam passing through the first confocal stop onto a specimen;
- a second collection optical system configured to collect a light beam from the specimen onto a second confocal stop;
- a detection unit configured to detect a light beam passing through the second confocal stop; and
- a light intensity control member provided to at least one of the first collection optical system and the second collection optical system and having a transmittance of a first region including an optical axis that is lower than a transmittance of a second region around the first region,
- wherein when a ratio of the numerical aperture of the illumination optical system on the first confocal stop side to the numerical aperture of the first collection optical system on the first confocal stop side is represented by σ, the ratio satisfies a range of $0.3 \leq \sigma \leq 1$.

* * * * *